A. F. McCOLLUM.
PILE CUTTING MECHANISM.
APPLICATION FILED JAN. 31, 1913.
1,161,709.
Patented Nov. 23, 1915.
9 SHEETS—SHEET 3.
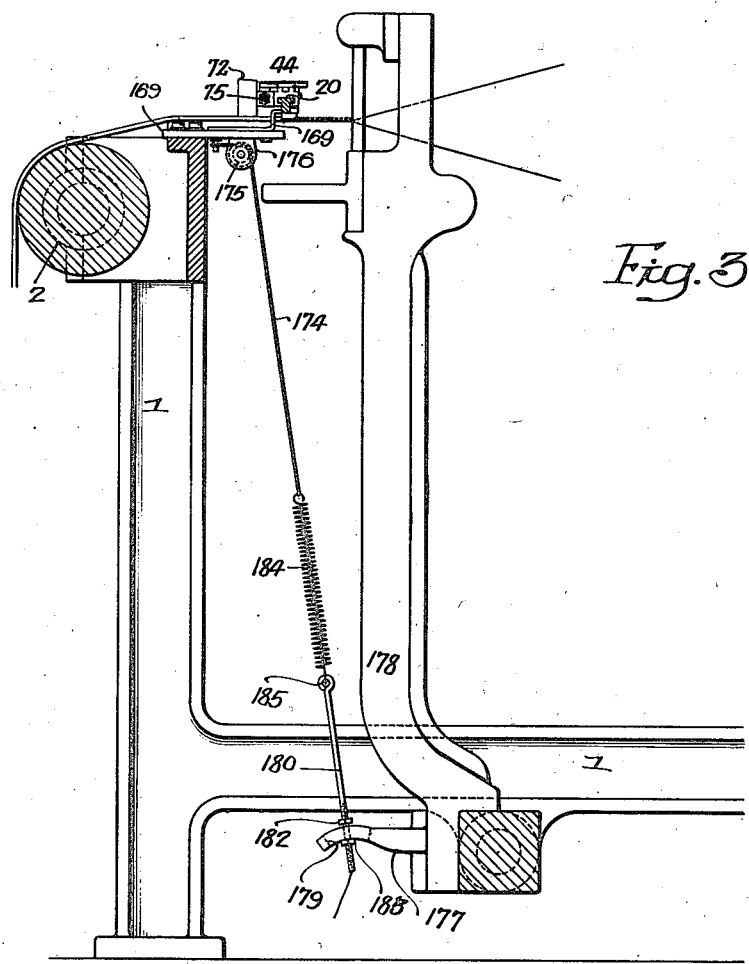
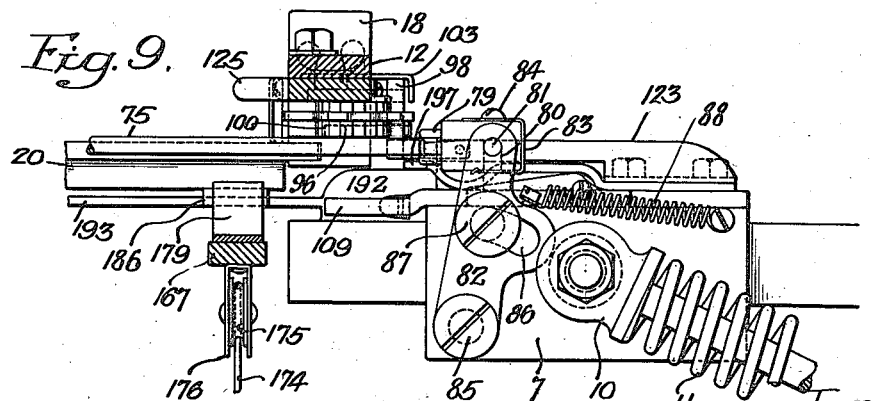

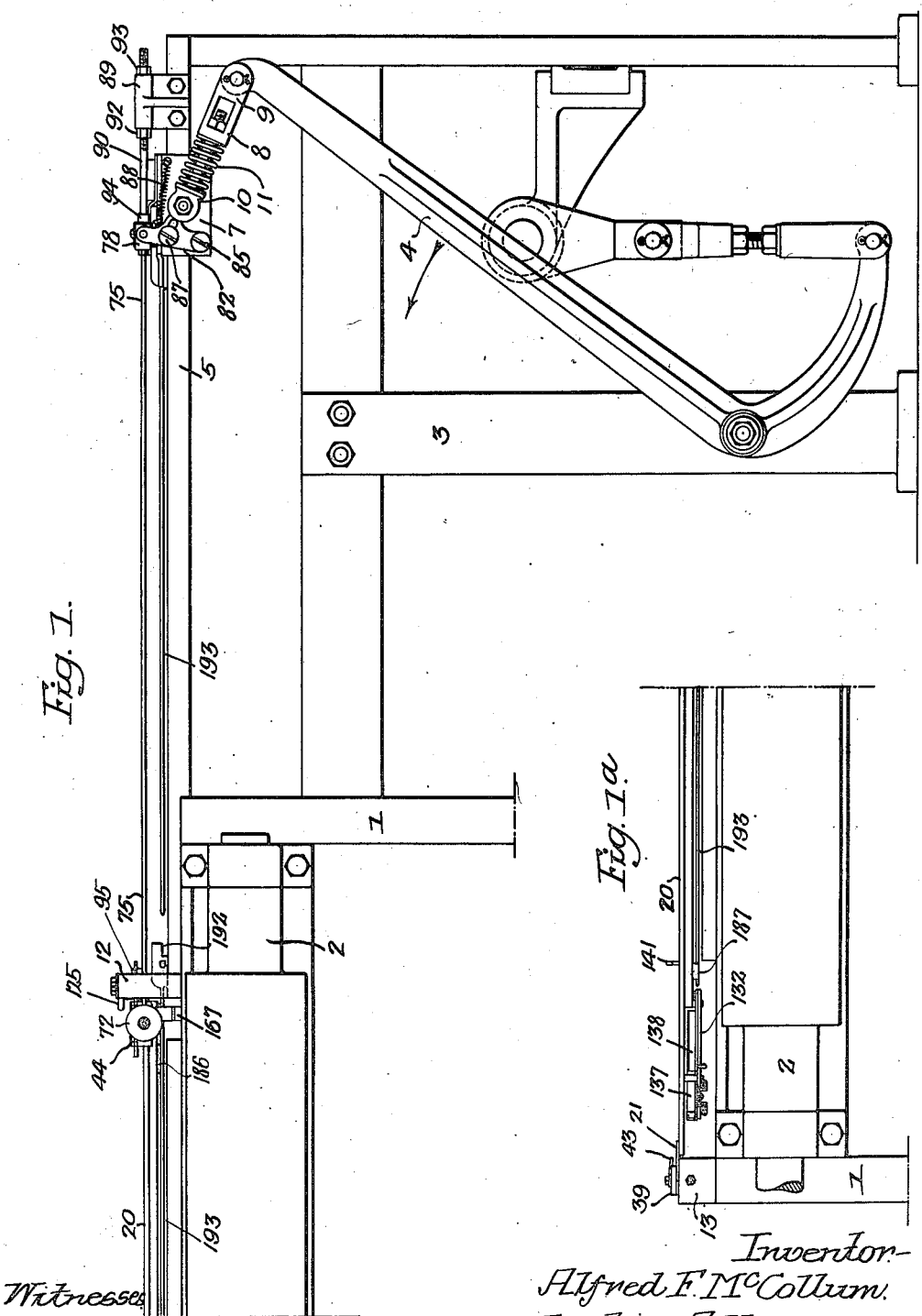

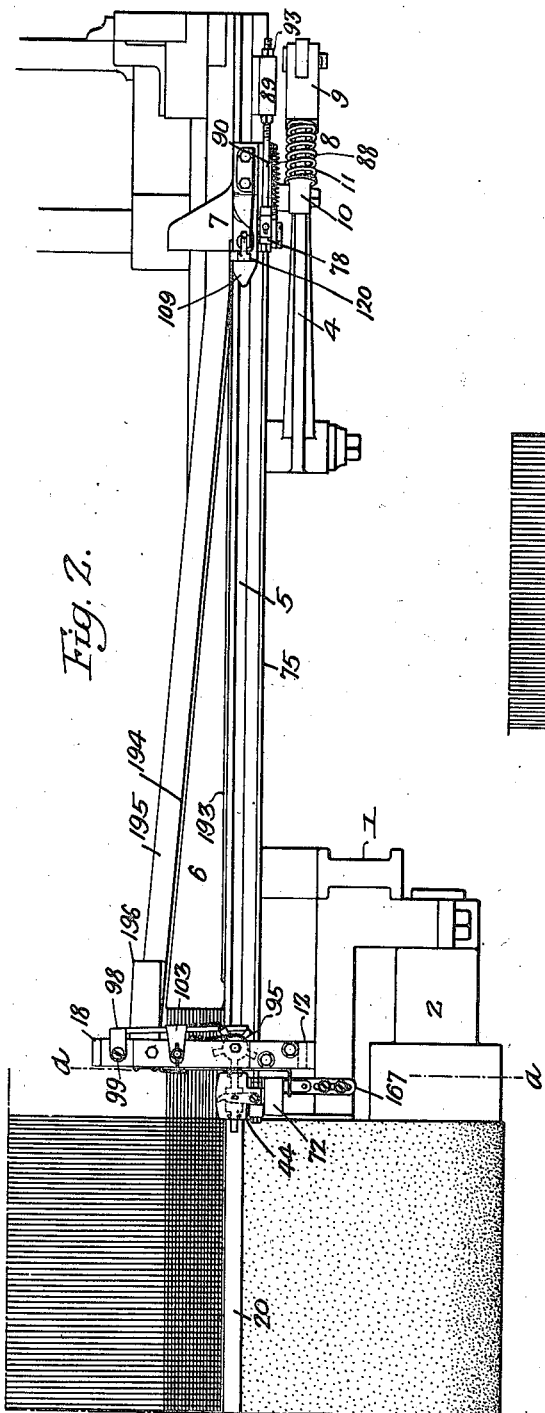

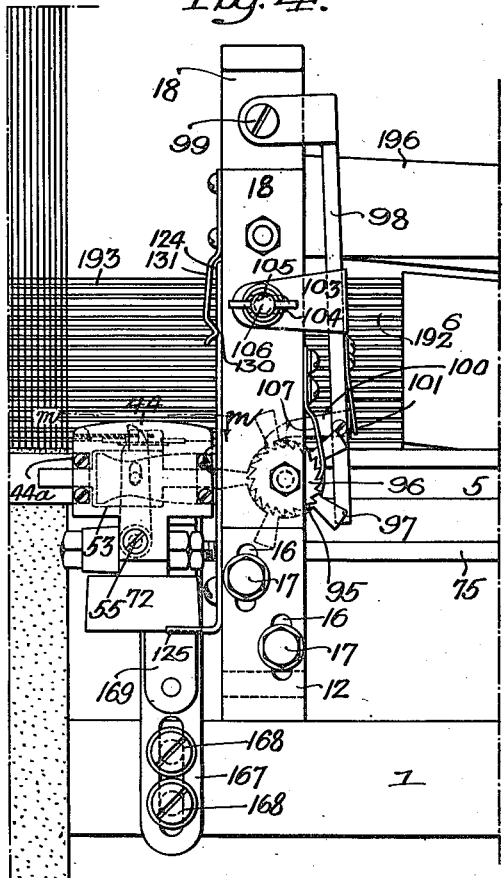

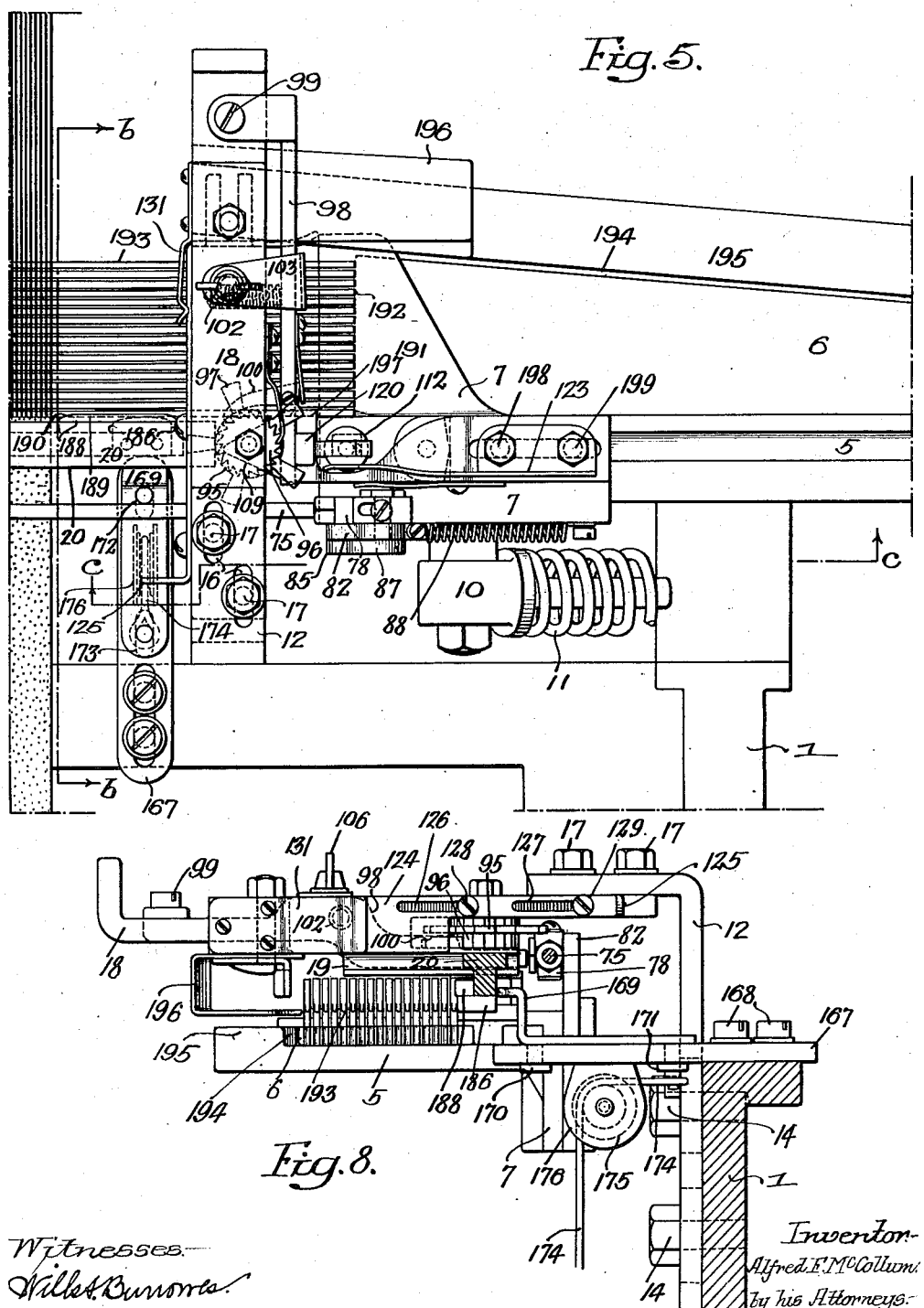

A. F. McCOLLUM.
PILE CUTTING MECHANISM.
APPLICATION FILED JAN. 31, 1913.
1,161,709.
Patented Nov. 23, 1915.
9 SHEETS—SHEET 6.
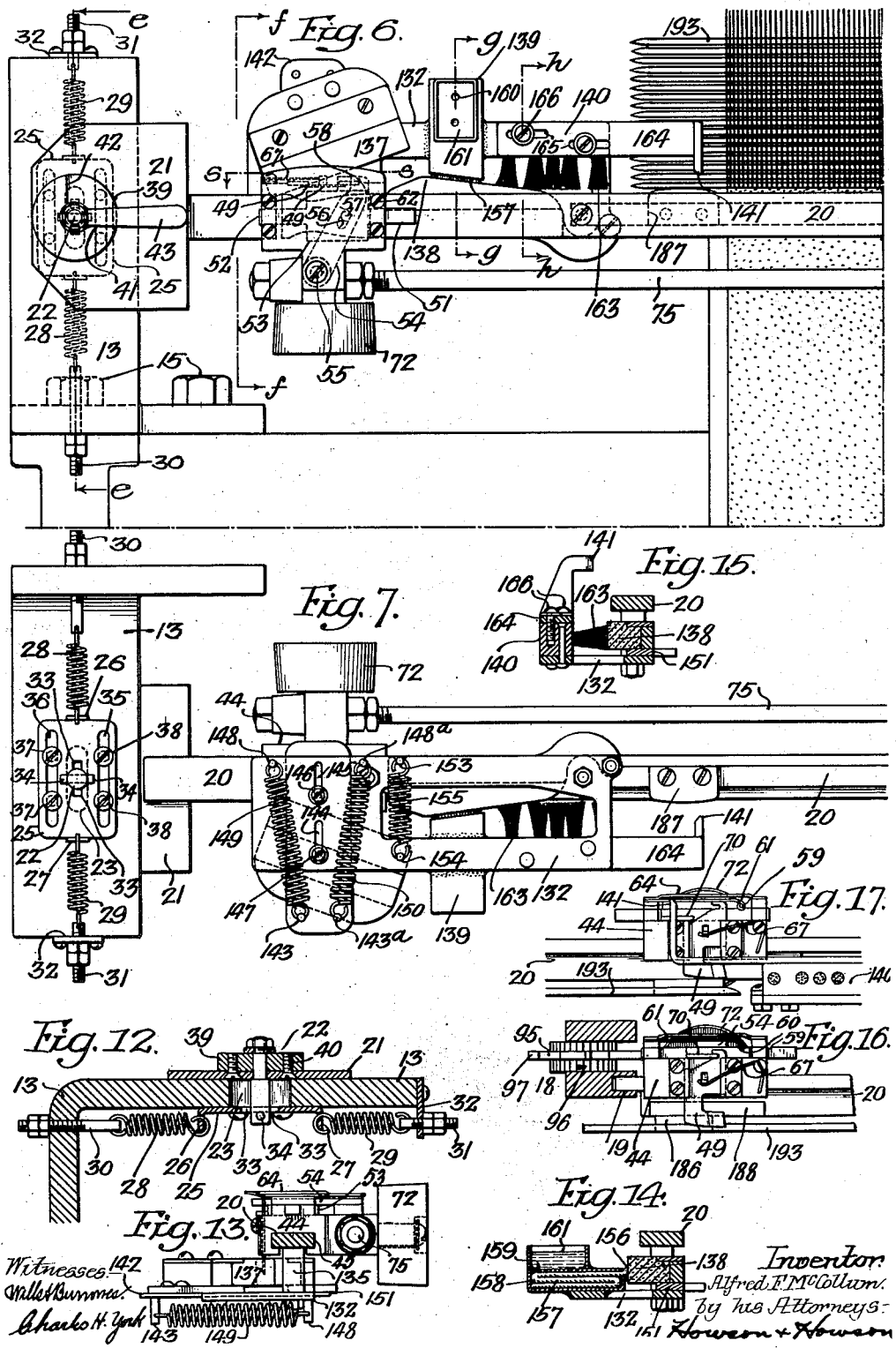
Witnesses:
Inventor:
Alfred F. McCollum.
by his Attorneys:
Howson + Howson

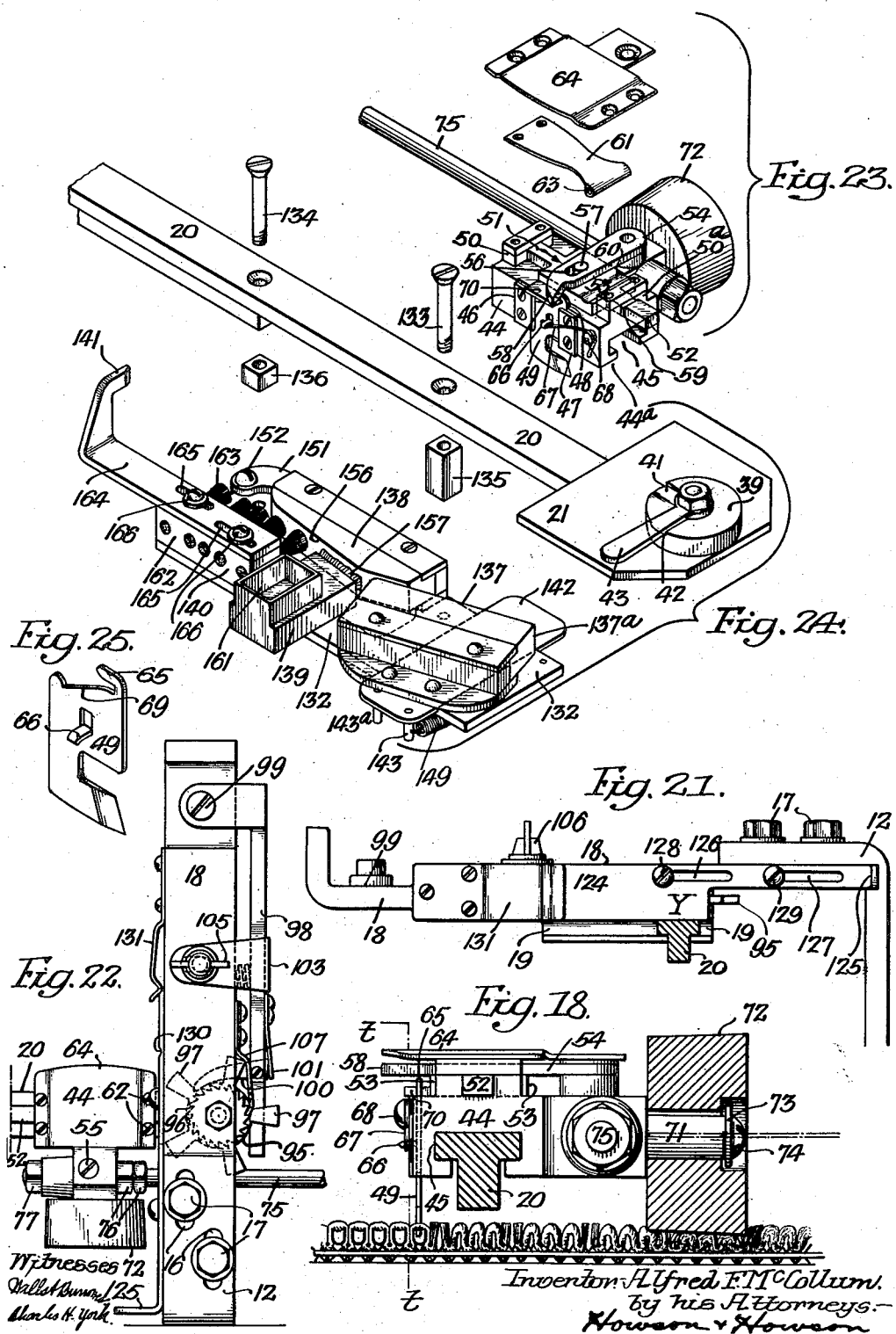

A. F. McCOLLUM.
PILE CUTTING MECHANISM.
APPLICATION FILED JAN. 31, 1913.
1,161,709.
Patented Nov. 23, 1915.
9 SHEETS—SHEET 8.
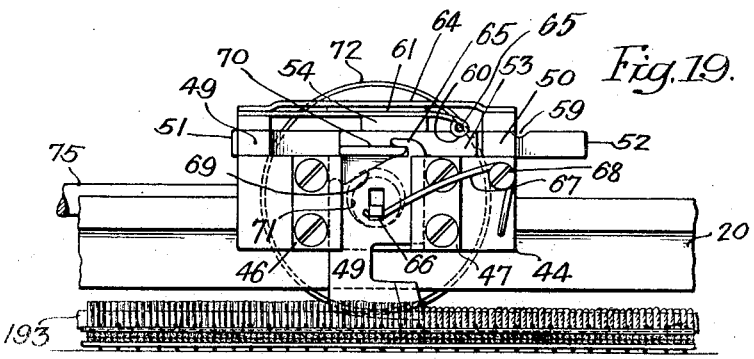
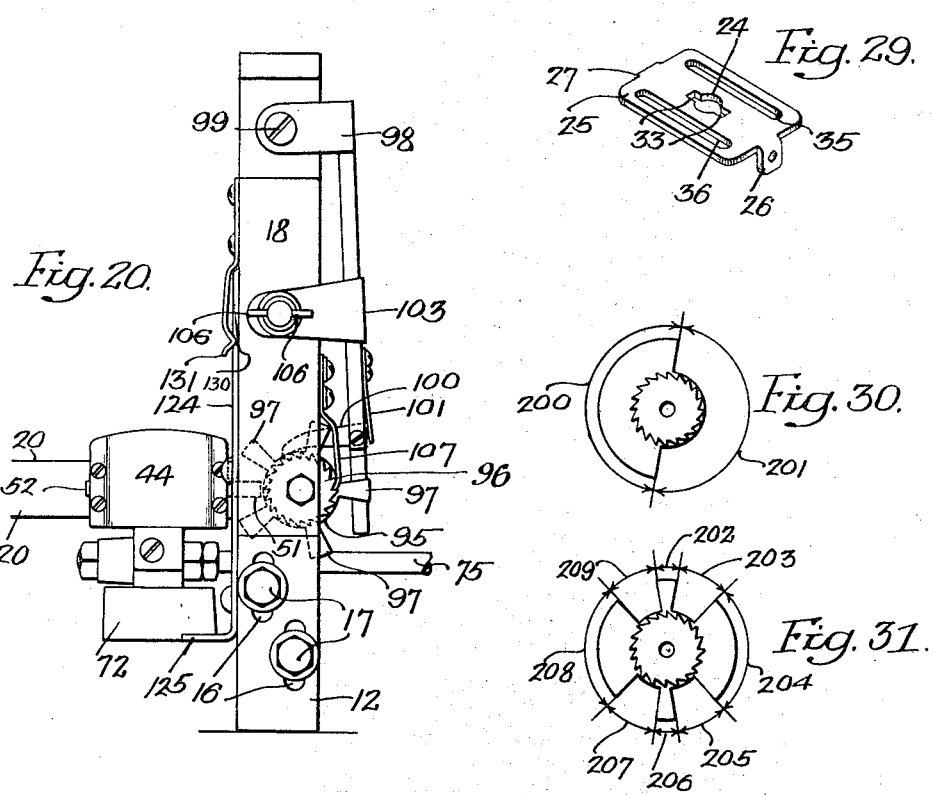
Witnesses—
Nills A Burrows
Charles H. York
Inventor—
Alfred F. McCollum.
by his Attorneys—
Howson & Howson A. F. McCOLLUM.
PILE CUTTING MECHANISM.
APPLICATION FILED JAN. 31, 1913.
1,161,709.
Patented Nov. 23, 1915.
9 SHEETS—SHEET 9.
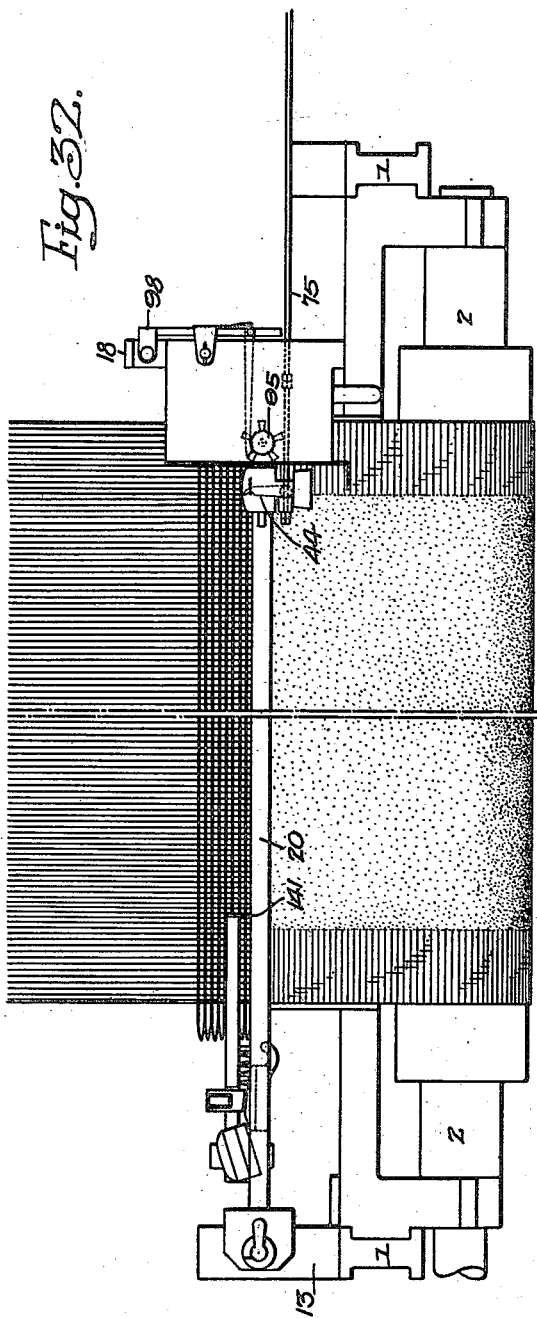
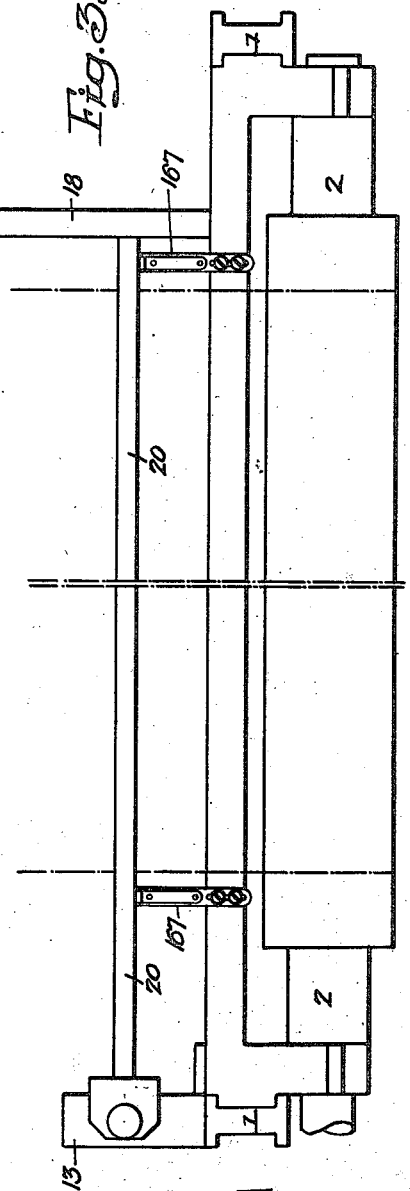
Witnesses—
Willet Simons
Charles H. York.
Inventor—
Alfred F. McCollum.
by his Attorneys—
Howson & Howson

UNITED STATES PATENT OFFICE.

ALFRED F. McCOLLUM, OF BLOOMSBURG, PENNSYLVANIA, ASSIGNOR OF THREE-FIFTHS TO JAMES MAGEE, 2D, OF BLOOMSBURG, PENNSYLVANIA.

PILE-CUTTING MECHANISM.

1,161,709.   Specification of Letters Patent.   Patented Nov. 23, 1915.

Application filed January 31, 1913.   Serial No. 745,431.

*To all whom it may concern:*

Be it known that I, ALFRED F. McCOLLUM, a citizen of the United States, residing in Bloomsburg, Pennsylvania, have invented certain Improvements in Pile-Cutting Mechanism, of which the following is a specification.

My invention relates to weaving and consists of improvements in pile cutting mechanism and is especially adapted for cutting the pile of fabrics which form their pile tufts by being woven over wires, and especially wires having grooves for the passage of pile cutting knives such as disclosed in my Patent No. 709,447, dated Sept. 16, 1902.

Heretofore in the cutting of the pile of the fabric, as above mentioned, the mechanism was operated to cut the pile of each successive pick unless the same was thrown out of operation by hand so that it did not move the knife into engagement with the pile warp. This manual operation had to be performed when the cutting mechanism was in a position free from any part of the fabric structure so as not to injure either the fabric or the cutting mechanism due to the natural take up of the fabric. In performing this manual operation, the weaver had to either be very quick in releasing the cutting mechanism when the same was outside the edge of the fabric or he was compelled to stop the loom until the same was released. Another source of trouble in cutting the pile with a mechanical operating attachment, particularly that of wide fabric such as tapestry Brussels rugs was the fact that the knives soon became dull which necessitated their removal for sharpening purposes and the consequent stoppage of the loom.

One of the objects of my invention is to equip a loom with mechanism for cutting the pile of fabrics and which will automatically throw out the cutting mechanism to weave uncut picks or wires thereafter automatically operating to again cut successively.

Another object of my invention is to provide means for operating the said pile cutting means to cut any number of picks or to prevent the cut of a number of picks and which will be operable independently of the said automatic knife controlling means mentioned above.

Another object of my invention is to automatically sharpen and clean the pile cutting knives while the same are operating in the loom.

A further object of my invention is to effect the evening of the pile after being cut and by mechanism operable in conjunction with the pile cutting mechanism.

Another object of my invention is to equip the loom with mechanism which will act to prevent pounding and jarring of the foregoing mechanism, thus preventing injury to the several parts.

Still another object of my invention is to provide mechanism operable simultaneously with the beat up of the lay for alining and properly supporting the pile wires and operable with the return of the lay to release the pressure against the wires so that they may be withdrawn by the wire motion.

These objects I attain in the following manner reference being had to the accompanying drawings in which, Figures 1 and 1ª show a front elevation of part of a loom provided with my invention; Figs. 2 and 2ª show a top plan view of the mechanism shown in Fig. 1 and Fig. 1ª respectively; Fig. 3, is a transverse sectional elevation taken on the line *a—a* Fig. 2; Fig. 4 shows an enlarged plan view of certain of the elements of my invention in the position shown in Fig. 2; Fig. 5, is an enlarged plan view of certain of the elements shown in another position; Fig. 6, is an enlarged plan view showing the position of the pile cutting mechanism when certain of the other elements are in the position shown in Fig. 5; Fig. 7, is an inverted plan view of the elements of my invention as shown in Fig. 6; Fig. 8, is a transverse section on the line *b—b* Fig. 5; Fig. 9, is a fragmentary sectional elevation taken on the line *c—c* Fig. 5; Fig. 10, is a plan view of the wire withdrawing mechanism and the means for moving the pile cutting mechanism; Fig. 11, is a section on the line *d—d* Fig. 10; Fig. 12, is a section on the line *e—e* Fig. 6; Fig. 13, is a section on the line *f—f* Fig. 6; Fig. 14, is a section on the line *g—g* Fig. 6; Fig. 15, is a section on the line *h—h* Fig. 6; Fig. 16, is a section on the line *m—m* Fig. 4; Fig. 17, is an elevation of similar nature to Fig. 16 showing certain of the elements in different positions and actuated by a tripping finger which I employ; Fig. 18, is a sectional elevation of certain of the elements of my invention in the position which they occupy when acting upon the fabric to cut the pile and for evening and opening up the cut pile tufts; Fig. 19, is an elevation taken on the line t—t Fig. 18 and showing the fabric sectioned transversely through the warp; Fig. 20, is a plan view of certain of the parts in a different position from that shown in Fig. 4; Fig. 21, is an elevation showing certain of the elements in a position different from that shown in Fig. 8; Fig. 22, is a plan view of the elements shown in Fig. 21 in another position; Fig. 23, is a detached perspective view of the pile cutting and evening mechanism of my invention; Fig. 24 is a detached perspective view of the knife sharpening and cleaning mechanism shown together with the supporting means therefor; Fig. 25, is a perspective view of a pile-cutting knife which I preferably use; Figs. 26, 27, and 28, are diagrammatic views showing successive stages in the cleaning and sharpening of a pile cutting knife; Fig. 29, is a perspective view of a link-plate which I employ; Figs. 30 and 31, are modified forms of pattern wheels which may be used, Figs. 32 and 33 are plans, to some extent diagrammatic, illustrating modified arrangements of certain parts of my invention.

Referring to the drawings, 1 is the main frame of the loom having a take up roller 2 for the fabric and an auxiliary frame 3 attached thereto, for the support of the sweep arm 4 in the usual manner. The wire bed 5 having the wire switch 6 is supported on the main frame 1 and auxiliary frame 3, and provides a sliding support for the wire carriage 7 which is connected to the sweep arm 4 by a connecting arm 8 comprising a head 9 and a stem 10 slidably connected to the head 9. A spring 11 is interposed between the head 9 and the stem 10 to take up any jars or difference in the movement therebetween during the wire picking movement.

Two supports 12 and 13 are respectively secured to opposite sides of the frame 1 by bolts 14 and 15 or their equivalent. The support 12 is provided with slots 16 through which bolts 17 pass and are secured to an extension 18 as clearly shown in Figs. 4, 5 and 21, so that it is obvious that the extension 18 can be adjusted by means of the said slots 16 and bolts 17.

The extension 18 is grooved at 19 (Figs. 8 and 20) and forms a bearing for one end of a guide rod or rail 20, which extends across the loom and over and above the fabric, and is provided at its opposite end with a plate 21 which has a sliding bearing on the upper face of the support 13. A bolt 22 passes through the plate 21 and a slot 23 in the support 13, and also through an aperture in a link-plate 25; the latter having depending flanges 26 and 27 which are respectively connected to the ends of two tension springs 28 and 29; the latter having their opposite ends secured to bolts 30 and 31 passing through the support 13 and a depending flange 32 on the support 13 respectively. The link-plate 25 is also slotted parallel with its length as at 33, and the end of the bolt 22 has a pin 34 rigidly secured thereto as shown in Figs. 7 and 12 so that when the elements just described are assembled, the said pin 34 will occupy a position at right angles to the slot 33 (such a position being shown in Fig. 7). The link-plate 25 is also provided with longitudinally extending slots 35, 36, and screws 37 and 38 pass therethrough and are secured in the support 13.

A disk 39 is secured to the plate 21 by screws 40 or any other means, and the upper face of the said disk is cut-away at 41 and 42. The portions 41 and 42 are radially disposed to the center of the disk and the bolt 22 and are 90° apart. These cut-away portions 41 and 42 form a seat to limit the movement of a handle 43 which is secured to the bolt 22, in either one of two positions at right angles to each other, so that when it is in the position shown in Fig. 6 the pin 34 will be at right angles to the length of the slot 33, and when it is turned into the seat 42 or at right angles to the position shown in Fig. 6, the pin 34 will register and be in an alinement with the slot 33. When turned in this latter position the bolt 22 may be raised from the support 13 when it is desired to remove the rail 20 from the loom. The springs 28 and 29 as shown allow the rail 20 to slide over the face of the support 13 in the direction of the slots 35 and 36 in order to allow a movement of the rail 20 in a direction transverse to its length; the slot 19 on the extension 18 also allowing the said latter movement of the rail 20.

A carriage 44 has an undercut slideway 45 on its under surface and the same is of such a contour as to straddle the rail 20 so that the carriage may slide thereon but will be secured thereto and be prevented from vibration thereon during its passage thereover. The carriage 44 has two plates 46 and 47 secured thereto by screws or any other means and is cut away at 48 so that said plates will form a guideway for a pile cutting knife 49.

The upper face of the carriage 44 is provided with bearing blocks 50 and 50ᵃ adjacent opposite ends. These blocks are spaced apart and form a slideway for opposite ends 51 and 52 of a shogging plate 53 which is adapted to slide upon the upper face of the carriage 44 when actuated by mechanism which will be hereinafter described. A tripping lever 54 is pivotally connected to the carriage 44 by a screw 55 and is slotted at 56. A pin 57 is secured to the shogging plate 53 and extends within the slot 56; the tripping lever 54 having a free end 58 which extends beyond the side of the carriage and is adapted to engage mechanism during the passage of the carriage 44 over the rail 20 for the purpose of moving the shogging plate 53. The shogging plate 53 is recessed on its upper surface at 59 and 60 and a spring 61 secured by screws 62 has a portion 63 which will enter the said recesses when the plate 53 is in different positions and thereby prevent the latter from vibrating due to jarring. The carriage 44 has a cover 64 which prevents the several parts from being clogged with fibers and dirt, and also serves as means for the protection of the working parts on the carriage. The knife 49 has a hooked extension 65 and a lip 66. A torsion spring 67 is mounted on the side of the carriage at 68 with its free end engaging the under surface of the lip 66 and tends to raise the knife under certain conditions. The upper edge of the knife is formed so as to provide a cam or incline 69 which is adapted to be engaged by an extension 70 on the shogging plate 53, which acts against the spring 67 when the knife is up to lower the knife when the shogging plate is moved in the direction indicated by the arrow in Fig. 23. When the knife has been lowered the construction is such that the hooked projection 65 will extend over the upper surface of the extension 70 which thus forms a locking or holding means and it is then impossible to lower the knife to a greater degree than is shown in Fig. 23. This latter construction acts as a safety device to prevent the knife from being lowered to such a degree as would injure or cut threads other than the pile forming threads should the knife pass over the warp when there was no wire therein.

The carriage 44 has a cylindrical pin 71 secured thereto, which forms a journal for a frusto-conical roller 72, and I preferably make the bore or journal-bearing of the roller 72 of such greater diameter than the pin 71 that the roller 72 will fit loosely on the latter and be free to vibrate during the passage of the carriage over the rail 20 and to engage the cut pile as clearly shown in Fig. 18. The roller 72 may be secured to the pin 71 in any well known manner; the construction shown in Fig. 18 consisting of a washer 73 and a screw 74 threaded in the end of the pin 71.

The carriage 44 is reciprocated on the rail 20 by the following mechanism: A bar 75 passes through the said carriage 44 and is adjustably secured thereto by nuts 76 and 77 as is clearly shown in Fig. 22. The opposite end of the bar 75 has a head 78 secured thereon, and a lock nut 79 tends to prevent the said head 78 from becoming loose. The head 78 is slotted at 80 and a pin 81 secured to the upper end of a lever 82 extends within the said slot 80. A spring 83 is secured to the head 78 by a screw 84 and is adapted to span the groove at its intersection with the lower face of the head 78, so that when the machine is in operation the head 78 will not be thrown out of engagement with the pin 81. The lever 82 is pivoted to the wire carriage 7 at 85 and is slotted at 86 concentric with the pivot 85. A screw pin 87 extends through the slot 86 and into the carriage 7 so that the lever 82 can move only to the length of the slot 86. A tension spring 88 connects the lever 82 to the wire carriage 7 as clearly shown in Fig. 9. It will thus be seen that as the sweep arm 4 operates to move the carriage 7 back and forth over the bed 5 the bar 75 and consequently the carriage 44 will receive a corresponding movement.

A standard 89 is rigidly secured to the bed 5 and a buffer bar 90 is mounted therein and adjustably secured by lock nuts 92 and 93 mounted on the threaded portion thereof. The end 94 of the buffer bar 90 is adapted to act as a limit for the extreme rearward movement of the head 78 of the bar 75 and is arranged to take the strain off other working parts of mechanism.

A design or pile pattern wheel 95 is rotatably mounted on the extension support 18 and has a ratchet wheel 96 integral therewith and a series of projections 97 spaced apart as clearly shown in Figs. 4, 5, 20 and 22. The wheel 95 is so journaled that the axis extends vertically and is in alinement with the path of movement of the end 51 of the shogging plate 53. The outer ends of the projections 97 on said wheel 95 are so placed as to form abutments at certain times for the end 51 of the shogging plate 53. An actuating lever 98 is pivoted at 99 to the extension support 18 and forms a pivotal support for a pawl 100, which is normally kept in contact with the ratchet wheel 96 by a spring 101. A compression spring 102 is housed within a cavity in the extension support 18 and has its outer end in pressing contact with the inner surface of the actuating lever 98 (Fig. 5) so as to move it away from the extension support 18 in the direction of the arrow Fig. 4, and at the same time cause the pawl 100 through the ratchet wheel 96 to move the design wheel 95 to the extent of one tooth.

The actuating lever 98 is provided with a wing or extension 103 which is slotted at 104 and a screw 105 having a thumb nut 106 integral therewith passes through the slot 104 and screws within the extension support 18, so that if it is desired to prevent the lever 98 from moving outward the latter may be manually moved toward the support 18 and the thumb nut 106 turned so as to clamp the wing 103 to the said support 18 (Fig. 21). A detent or spring pawl 107 is secured to the support 18 and prevents the back lash or turning of the ratchet 95.

The wire carriage 7 forms a pivotal support for a wire withdrawing hook 109; the latter having a slot 110 formed therein through which passes an elongated portion 111 of a threaded swivel pin 112 having a head 113 which is slotted at 114 and recessed at 115 and 116. These recesses have two compression springs 117 and 118 adapted to press against the under surface of a yoke shoe 119 which straddles the head 113 and passes through the slot 114. An actuating pin 120 is pivoted within the slot 114, and when in a horizontal position rests with one of its sides in contact with the shoe 119; the latter tending to keep the same in this position and prevent it from being moved by jarring or the like. Also, when the pin 120 is moved in a vertical position as shown in dot-and-dash lines Fig. 11, the shoe 119 tends by acting against the straight inner end thereof to keep the pin in a vertical position as is obvious from the construction shown; it being necessary to move the pin manually from the horizontal position to the vertical position or vice versa. By this latter construction it will be noticed that if the pin 112 is turned in the direction of the arrow X Fig. 10, by using the actuating pin 120 as a lever, the elongated portion 111 of the said pin will act as an eccentric against one side of the slot 110 and tend to move the hook 109 in the direction of the arrow X' (Fig. 10). The portion 121 of the hook will then be moved out of its normal path of action and will not engage the jacks of the wires and will not withdraw the latter from the fabric.

The swivel screw 112 has its outer face flattened at 122 and a spring 123 secured to the carriage 7 normally bears against the said flat portion 122 so as to keep the pin 120 in the position shown in Figs. 10 and 11, so that the hook 109 will engage the jacks of the wires and normally withdraw the latter from the fabric. When the carriage is moved forward, the end of the pin 120, when in the position shown in full lines in Figs. 2, 5, 10 and 11, will strike and move the actuating lever 98 toward the design wheel 95 causing the pawl 100 to slide over the ratchet teeth of the ratchet 96. However, as soon as the pin 120 moves away from the lever 98 the spring 102 will move the lever 98 in an opposite direction causing the pawl 100 to engage and move the ratchet 96 and consequently the design wheel 95.

A plate 124 is provided with a handle 125 and has slots 126 and 127 through which screws 128 and 129 pass to secure the said plate 124 to the extension support 18. The plate 124 has a portion Y which may be slid in front of the design wheel 95, when the latter is moved in the position as shown in Figs. 20 and 22. When in this position the portion Y will be engaged by the end 51 of the shogging plate 53 during each rearward movement of the carriage 44 and thereby cause the knife 49 to be lowered to cut the pile. However, this plate 124 is only moved into this position when it is desired to cut every row of pile loops of the fabric and acts as a relief for and independently of the design wheel. The plate 124 is recessed at 130, and when in its normal state, with the portion Y clear of the design wheel as shown in Fig. 8, it is prevented from being moved by the end of a spring 131, secured to the extension support 18, and extending into the recess 130. When in the position shown in Figs. 20 and 21 the said ends of the spring will press against the inner end of the plate 124 and keep it in the proper position. Also, when it is desired to keep the plate 124 in the position shown in Figs. 20 and 21 to cut pile on all or a large number of the rows of pile loops, the design wheel may be moved into the position shown in Fig. 22 so that the projections 97 will be clear of and beyond the inner side of the plate 124. The actuating lever 98 is then moved toward the design wheel 95 and clamped in position by turning the thumb screw 106. In this latter position the pin 120 will not strike the actuating lever 108 and the design wheel 95 will remain stationary.

A table plate 132 is suspended from the rail 20 by means of screws 133 and 134 and is spaced from the said rail 20 by means of bushings 135 and 136 (Fig. 24). This table plate 132 forms a support for two sharpening stones 137 and 138, an oiling reservoir 139, a brush 140, and a tripping finger 141. The sharpening stone 137 is secured to a slidable plate 142, which is counter-sunk in the table 132 and has projections 143 and 143ª depending from its lower surface. The table 132 is slotted at 144 and 145, and screw pins 146 and 147 pass therethrough into the plate 142. Pins 148 and 148ª depend from the lower surface of the table 132, and tension springs 149 and 150 have their opposite ends respectively connected to the projections 143 and 148, and 143ª and 148ª, preferably in such a manner that they are radially disposed as clearly shown in Fig. 7. The plate 142 is adapted to slide on the table 132 in a direction substantially at right angles to the line of movement of the carriage 44 and the stone 137 is preferably placed at an incline to the direction of movement of the said carriage 44. The stone 138 is supported on an arm 151 pivoted to the table 132 at 152 and has a depending projection 153 adjacent its free end. A lug 154 is fixed within the lower portion of the table 132 and a tension spring 155 connects the projection 153 with said lug for normally keeping the sharpening surface 156 of the stone 138 in contact with a lubricating wick 157, which is mounted within a sub-chamber 158 in the oiling reservoir 139. A partition 159 has perforations 160 which allow oil to be absorbed by the wick 157 when the same is poured into an upper chamber 161.

The brush 140 comprises a block 162 having a series of bristle clusters 163, the bristle clusters closest to the oil reservoir 139 being arranged to contact with the sharpening surface 156 of the sharpening stone 138. The tripping finger 141 has an extension 164 which is slotted at 165 and screws 166 pass through the said slots into the block 162 so that the tripping finger is adjustably mounted and may be moved into different positions by operating the screws 166.

The disposition of the sharpening stones 137 and 138 is such that the knife 49 during its passage forward across the loom will first engage the sharpening surface 156 of the stone 138 and then by moving the latter on the pivot 152 against the action of the spring 155 pass on to the sharpening surface 137$^a$ of the stone 137, moving this against the action of the tension springs 149 and 150. The stones 137 and 138 are so mounted that they may be freely removed when desired and replaced by other stones. However, I preferably have these stones molded or otherwise made of a composition which is extremely hard and which is very slightly affected, after a long and constant use, by the pile cutting knives. For example, I may employ what is commercially known as Indian stone or carborundum.

A bracket 167 is adjustably secured to the main frame 1 by screws 168 and forms a sliding support for a wire alining finger 169; the latter having pins 170 and 171, which pass through slots 172 and 173 in the bracket 167. The pin 171 extends sufficiently below the lower face of the bracket 167 to allow a cord 174 to be attached thereto, said cord passing over a pulley 175 rotatably mounted in a hanger 176 which is secured to the bracket 167. The alining finger 169 normally contacts with the outer face of the rail 20 (Figs. 3, 5 and 8). A foot 177 is secured to the lay arm 178 and adjacent the end of and extends toward the breast beam of the loom having in it a slot 179 running in the direction of the beat up of the fabric. A rod 180 has a threaded end 181 passing through the said slot and secured to the foot 177 by means of nuts 182 and 183. A tension spring 184 has one end secured to an eyelet 185 on the upper end of the rod 180 and the other end attached to the opposite end of the cord 174, so that as the lay moves forward to beat in a pick of weft and a pile wire, the free end of the foot 177 will move downwardly and thereby stretch the spring 184, moving the alining finger against the rail 20 and tending to move the latter toward the lay. The rail 20 carries two wire-alining plates 186 and 187, which are preferably secured to the lower surface thereof; the function of these plates being to press against the first wire, or in other words the wire nearest the breast beam. Therefore it will be obvious that when the cord 174 is pulled on the forward beat up of the lay the plates 186 and 187 will press against the said wire with a pressure equal to the pull of the cord 174 when the same has been stretched by the foot 177. On the other hand, when the lay moves rearwardly for the insertion of a new pick and another wire, and also while the said first wire is being withdrawn after having been cut in a manner described hereinafter, the foot 177 will move upwardly and thereby allow the spring 184 to contract and consequently decrease the tension on the cord 174 and the pressure of the alining plates 186 and 187. A knife-alining cam 188 is secured to the inner edge of the rail 20 and is of such a thickness that when the alining plate 186 is pressing against the first wire, the edge 189 of the plate 188 will be substantially over the center of the groove in the wire and will necessarily aline the knife to the center of the groove when the knife comes in contact with said edge. The said cam 188 has its forward end tapered or reduced in thickness as at 190, so that as the body portion of the knife strikes the same, it will be positioned properly for making a cut on the next movement.

The wire insert arm 191 acts in the usual manner against the jacks 192 of the wires 193 to successively insert them within the sheds of the warp by moving them along the groove 194 of the wire switch 195 after having been withdrawn by the portion 121 of the withdrawing hook 109. The guard trough 196 serves the usual purpose of preventing the free ends of the wires from moving out of their proper positions during their insertion; the presser 197, which is adjustably secured to the carriage 7 by bolts 198 and 199 serving to hold the wires and jacks in their proper positions while the latter are within the weave of the fabric.

In the main views of drawing including Figs. 1 to 29, the design wheel 95 has five projections 97, each one of which is adapted to act as an abutment for the end 51 of the shogging plate 53, so that a fabric woven by the use of the special form of design wheel, as shown therein, will be such that one row of pile loops in every four rows will be cut, that is to say a fabric woven with the use of the design wheel 95 will have every fourth row of pile loops cut and the remaining rows uncut as shown in Fig. 18.

Assuming that the several parts are in the positions shown in Figs. 1, 1$^a$, 2, 2$^a$ and 4, the pile cutting knife 49 down within a groove of the first wire as shown in Figs. 18 and 23, and the end 52 of the shogging plate 53 is projecting beyond the edge 44ª of the carriage 44 the operation is as follows: The sweep arm 4 is moved in the direction of the arrow shown in Fig. 1 to actuate the wire carriage 7 to insert a wire in the usual manner, at the same time the knife carriage 44 is moved across the fabric, to cause the knife 49 to cut the pile warps which are stretched over the first pile wire. When the knife 49 has cut all of the warps which extend over the said wire, the end 58 of the lever 54 will strike the tripping finger 141, and as the carriage 44 continues to move in the same direction, said end will be arrested. On a continued movement of the carriage the latter will tend to move away from the shogging plate 53 and the end 58 of the lever 54, thereby causing a relative movement between the said plate 53 and the carriage 44 which will result in the projection of the end 51 the shogging plate 53 and the consequent withdrawal of the end 52 of the plate 53 within the limit of the outer contour of the carriage 44. The extension 70 will be moved from under the hooked portion 65 of the knife 49 and away from the upper edge 69 of the knife 49, thereby allowing the spring 67 to raise the cutting edge of the knife out of the groove of the said first wire. Thereafter the knife 49 is moved into contact with the brush 162 and any lint or dirt which has been collected by the knife during its travel during the cutting operation will be wiped or brushed therefrom (Fig. 26). As the carriage 44 continues to move the knife 49 comes in contact with the cutting face 156 of the sharpening stone 138 and in contact with the lubricating wick 157, thereby sharpening one face of the knife and tending to move the stone 138 in the direction of the arrow Fig. 27. A still further movement of the carriage 44 in the same direction will bring the knife in contact with the sharpening surface 137 and will thereby sharpen the edge on the opposite side of the knife blade; the stone 137 tending to move substantially at right angles to the path of movement of the knife and thereby always produce the same sharpening angle. During the latter part of the said forward movement of the knife carriage 44, the lay acts to beat up the last wire inserted, and in so doing causes pressure to be exerted on the side of the first wire through the medium of the plates 186 and 187 and the intermediate mechanism including the alining finger 169, cord 174, spring 184, rod 180, and foot 177. The knife 49 is thereby kept in its proper cutting position within the groove of the said first wire and the wire is also kept in an erect position so that the cut pile tufts formed by the severing of the individual loops of warp will be of equal heights.

Just before the sweep arm 4 moves in the opposite or rearward direction, the lay will start on its rearward movement thereby allowing the spring 184 to contract consequently releasing the pressure of the alining finger 169 against the rail 20, and thereby decreasing the intensity of the pressure of the alining plates 186 and 187 against the first wire. As the sweep arm moves rearwardly, the first wire will be withdrawn by the hook 109 when the pressure of the plates 186 and 187 against the said wire is at a minimum. The said rearward movement of the sweep arm 4 also causes a correspondingly rearward movement of the carriage 44 across the loom in the following manner: The knife 49 moves away from the sharpening stone 137 and the latter moves into its normal position due to the action of the springs 149 and 150. A continued rearward movement of the said carriage 44 causes the knife to again engage and deflect the sharpening stone 138; the latter having again moved to its normal position due to the spring 155 when the knife passed it in its forward movement. The surface of the sharpening stone 138 is so shaped, that as the knife passes thereby during its movement, said stone will tend to follow in and remove any wire edge which may occur at the cutting edge during the forward sharpening movement.

During the rearward movement of the carriage 44, the end 58 of the lever 54 will not engage the tripping finger 141, as the said end will remain in the same position as it occupied just after passing the tripping finger during said forward movement, being retained in this position by the action of the spring 61 pressing within the recess 59 on the shogging plate 53. However, during the said forward movement of the sweep arm 4, the pin 120 struck and moved the actuating lever 98 into the position as shown in Fig. 5, and thereby caused the pawl 100 to slide over the ratchet teeth of the ratchet wheel 96. Therefore, as soon as the sweep arm 4 starts rearwardly and thereby moves the carriage 7 rearwardly, the pin 120 will move away from and release the actuating lever 98 and the compression spring 102 will then tend to move the said lever 98 outwardly. This will cause the projection 97, which is in alinement with the end 52 of the shogging plate 53, to be moved away from the end 51 of the said shogging plate 53 so that it will not contact with it when the latter approaches the end of its rearward movement. The end 51 is thus allowed of the shogging plate 53 to project within the space between two of the projections 97 on the design wheel (see Fig. 20) and thereby allows the cutting edge of the knife 49 to remain up, out of and above the next wire. Then on the next forward movement of the sweep arm 4 and the knife carriage 44, the knife will not cut the warp over the second wire (which has now become the first wire, due to the fact that the before mentioned first wire was withdrawn during the said rearward movement of the sweep arm 4).

During the above mentioned second forward movement, the several parts of the knife carriage will remain unchanged as the lever 54 is still out of the path of the tripping finger 141. However the actuating lever 98 will again be moved by the pin 120 striking it and will again actuate the pawl 100, so that on the next or second rearward movement, the ratchet will again be moved to actuate the design wheel 95. This second movement of the design wheel 95 will still allow a space to be in alinement with the end 51 of the shogging plate 53 so that the same will project between the said two projections 97 during the second rearward movement of the carriage 44. Also, during the next rearward movement, the position of the parts of the carriage 44 will not be changed until the actuating lever 98 is moved to again move the design wheel 95 and bring another portion of the space between the said two projections 97 into alinement with the end 51 of the shogging plate 53. On the fourth forward movement of the carriage 44, the knife will still remain in an upper and inoperative position and will move across the fourth row of pile loops without cutting the same, the operation so far described having resulted in a frabric having the first wire cut and the next three wires uncut.

During the next or fourth rearward movement of the sweep arm 4 the pin 120 will allow the lever 98 to be moved by the spring 102 to again move the design wheel into such a position that the next or successive projection 97 will be moved into a position to be engaged by the end 51 of the shogging plate 53 prior to the stopping of the said latter rearward movement of the carriage 44. When the end 51 of the plate 53 strikes the said latter projection 97 it is stopped and the continued movement of the carriage 44 causes a relative movement of said plate 53 resulting in the following action. The cam edge 69 of the knife 49 strikes against the extension 70 and thereby causes the knife to be lowered and until the hook portion 65 extends thereover as clearly shown in Figs. 16, 18, 19 and 23. This relative movement between the shogging plate 53 and the carriage 44 again causes the end 58 of the lever 54 to project beyond the carriage 44 in such a position, that when the carriage 44 receives its next forward movement to cut the pile on the fifth wire, the end 48 will again be deflected by the tripping finger 141 to effect the movement of the several parts as heretofore described in connection with the first wire. It will thus be seen that it takes four forward and rearward movements of the wire carriage with the design wheel and ratchet as shown in the main views of drawing, to move the design wheel a distance equal to the distance between the centers of two adjacent projections 97. However, the number and size of the said projections 97 may vary as may also the relative movement and pitch of the ratchet 96, so that wheels or their equivalent may be employed and operated in the production of the fabric in which any number of successive rows of pile loops may be cut or left uncut. For example in Fig. 30 a design wheel is shown which will give ten rows of uncut pile and ten picks of cut pile; the portion 200 producing the said ten rows of cut pile and the space indicated by the arrow 201 producing the ten rows of uncut. Also in the design wheel as shown in Fig. 31 the portion 202 will act to produce one row of cut pile; the space 203 will allow the production of two rows of uncut pile; the projection 204 will act to produce five rows of cut pile; and the space 205 will allow the production of two rows of uncut pile; the portions 206 and 208 act correspondingly to the portions 202 and 204; and the spaces 207 and 209 act correspondingly to the spaces 203 and 205. However, any number and arrangements of projections and spaces may be formed in a wheel in order to aid in the production of fabrics of different arrangements of the cut and uncut piles.

As heretofore stated when it is desired to weave a fabric in which a great number of successive rows of pile loops are to be cut, instead of throwing the mechanism, which controls the operation of the design wheel, out of operation and allowing the end 51 to continuously engage one of the portions 97, which would tend to injure and wear the said portion more than the other portions 97 not so engaged, I preferably move the design wheel 95 into the position shown in Fig. 22 and manually lock the actuating lever 98 in its innermost position, by turning the thumb nut 106, thereafter moving the slide 124 so that the portion Y of the latter will form the abutment-means for the end 51 of the plate 53 during each rearward movement of the knife carriage 44. When the plate 124 is moved into the position as just stated the knife 49 will be lowered into the grooves of successive wires and will cut and be sharpened during each forward movement in the manner heretofore described in connection with picks one and five, as the operation of the parts on the carriage is exactly the same as when the latter is moved in relation to the movement of the design wheel 95.

If it is desired to again set the design wheel 95 in operation in weaving after a certain portion has been woven by the use of the slide 124, the latter may be moved backward into its normal position and the thumb nut unscrewed thereby allowing the spring 102 to move the actuating lever outwardly and the pin 120 to actuate the lever 98 in the manner heretofore described.

When it is desired to weave a selvage or at the beginning and the end of a rug to weave a certain number of uncut rows of pile loops, the design wheel may be placed in such a position that no part of it will be engaged by the end 51 of the plate 53 and the pin 120 is raised in the position as shown in Fig. 11 in dot-and-dash lines, the knife being also in a raised position. The loom will then weave a number of uncut rows of pile loops, and this action may be continued as long as desired.

In cases of mis-weaves, or other accidents which will occur in weaving, the design wheel 95 is allowed to remain in the position just described or in a position which will not affect the end 51 of the shogging plate 53 when the knife is in a raised position, and the pin 120 is moved into the position as shown in dot-and-dash lines Fig. 10, said latter movement results in the deflection or pivotal movement of the hook 109 so as not to catch or move the jacks of the wires during the rearward movements of the carriage 7. However, when it is desired to again start regular weaving the pin 120 is moved into the position as shown in full lines in Fig. 10 and the mechanism will again operate to weave a pile fabric formed in accordance with the design predetermined by the design wheel. The action of the hook 109 is then to successively withdraw the wires from the fabric and insert them in their proper relation in successive sheds of the warp as in the regular weaving.

The tension springs 28 and 29 serve as a positioning means for one end of the rail 20 but allow the latter to move in either direction due to the take up of the fabric and also to the action exerted by means of the alining finger 169 and its connecting parts.

The roller 72 during its movement backward and forward across the fabric acts to spread and even the pile tufts and thereby give the fabric a smooth finish. By having the said roller made frusto-conical and loosely mounted so as to be free to slightly vibrate when passing over the fabric, there will be a rubbing or evening action on each row of pile loops, and as the roller is made sufficiently wide to cover a number of rows it will pass over each row a number of times while the fabric is being "taken up."

In order to prevent undue strain on the shogging plate 53 and other knife governing parts on the carriage 44, said plate is made of such a length that it will not abut the block 50ª, as the carriage 44 will be stopped in its rearward movement by the head 78 on the bar 75 striking against the buffer head 94 on the rod 90, which is fixed in the standard 89, before the said plate 53 will have moved in contact with said block. It will thus be seen that the knife operating mechanism will not be jarred by the stopping of the carriage 44. Also, the spring 88 mounted in the manner heretofore described will allow the sweep arm 4, or the wire carriage 7 in its rearward movement to have a length of stroke different from that prescribed for the bar 75 and carriage 44. For example, if the carriage 7 and sweep arm 4 would tend to move farther rearward after the head 78 and bar 75 had engaged the buffer head 94, the spring 88 would stretch and allow the corresponding difference in movement required. The spring 88 also tends to keep the head 78 against the buffer 94 and prevents the same from vibrating.

The construction of my invention is such as to render the several parts easy of adjustment, and while I have shown the same with a specific arrangement with respect to the loom, it will be understood that said member may be arranged in a different position and the parts may be varied in construction and design without departing from the spirit of my invention. For example, I have shown the design wheel 95 and the tripping finger 141 in such positions as to respectively lower and raise the knife 49 at points outside of the edges of the fabric, so that when the knife 49 cuts the pile of the fabric it cuts from edge to edge. However, the design wheel 95, plate 124 and the tripping finger 142 can readily be positioned as shown in Fig. 32 so that the knife can be lowered to engage the fabric at points directly over the fabric and in from the edges of the latter. If the parts are positioned in this latter arrangement, all the pile will remain uncut adjacent the edges and will be cut at the center. This latter arrangement would be particularly valuable in the production of rugs, as the same could be produced having an uncut pile border and a cut pile center. Also, instead of having one alining finger 169 and foot 177 on one side of the loom, each arm 178 of the lay could be provided with a foot 177, and two alining fingers 169 could be arranged one adjacent each side of the loom having corresponding parts, for example, the cord 174, spring 184 and rod 180, as shown in Fig. 33. For example, this latter construction could be followed when my invention is applied to extremely wide looms such as are employed for weaving wide gage rugs. Also, my invention is such as to be easily controlled by the weaver as the several parts are designed to take up very little room on the loom and are timed and operated with relation to parts which are positive in operation.

The arrangement of the lubricating means is such as to provide a sufficient amount of lubrication to the stones and to the pile cutting knife without being tracked or smeared over the other parts of the loom, and the weaver can keep the wick properly moistened, by merely pouring from time to time, a little oil or mixture of oil and gasolene within the upper chamber 61.

Heretofore in the weaving of wide gage cut pile fabrics, such for example as tapestry velvet rugs, the pile was usually cut by inserting and withdrawing wires, each of which having a knife thereon. However, this system had the following disadvantages: As there was no means provided for sharpening the knives they soon became dull, and, after each wire had cut a few rows of pile loops, the difference in appearance of the cut pile was extremely noticeable, as the knives, when they became dull, cut a ragged and uneven pile which gave a shaded and streaky effect to the fabric. This was particularly noticeable in weaving solid color fabrics, for since the knife on each wire was located adjacent the free end, the entire wire during its removal was moved in frictional engagement with the pile loop which required great power to drive the wire motion. This friction between the wire and the pile warp which was stretched thereover was such as often to injure the yarn during the withdrawal, and unless said pile warp was loosely looped over the wire it was liable to be distorted and moved out of its proper position, so that when cut it produced an uneven surface of fabric which required an extra amount of finishing before being marketable. With my invention the knife cutting plate can be accurately sharpened for each pick and it may be used with great advantage for cutting wide fabric, such for example, as fabrics ranging from nine feet to twelve feet wide or wider, since each row of pile loops will be cut with a sharp cutting edge which will be substantially constant at all times. Also, since the pile warp is cut from each wire before the latter is removed it will be obvious that very little power is required to withdraw the wires which will not injure or distort the fabric during the withdrawal.

The rail 20 and the carriage 44 may be quickly and easily removed from the loom merely by turning the handle 43 at right angles to the position shown in Fig. 6 as heretofore described and bodily lifted, the opposite end of the rail being free to be moved out of the groove 19. The bar 75 and head 78 can be released from the pin 81 merely by turning the closure spring 83 on the pivot 84 so that the slot 80 will be open at the bottom. When in this position the bar 75 and the head 78 may be lifted clear off the pin 81 and removed together with the rail 20 from the loom. When it is desired to substitute another design wheel for the one that is in the loom, this may be done by loosening the nut on the bolt forming the pivot for the design wheel and by raising the latter the old wheel may be slipped out and the new wheel inserted. Also, if it is desired to change the position of any one of the projections 97, as might be advisable if the loom had to be run back due to a mis-pick, the same may be readily done by manually pressing the actuating lever 98 toward the support 18 and then releasing it, allowing the spring 102 to cause the ratchet wheel to be racked by the pawl 100. This may be done any number of times until the wheel occupies the desired position for the continuance of the weaving.

A loom equipped with my invention will operate smoothly and evenly and with very little noise as the operation of the knife carriage is the same at all times. Also, the knife sharpening, alining and cleaning means are arranged and constructed so as to accurately and evenly cut the pile warp on the desired wires.

I claim:

1. The combination, in a loom for weaving pile fabrics, of a knife carriage; a pile cutting knife movably mounted within the knife carriage; means for moving the carriage transversely to the length of the pile warp in opposite directions; means for moving the knife into cutting relation to cut the pile warp during a forward movement of the carriage transversely to the length of the pile warp; means for moving the knife on the carriage to move the same out of cutting relation with the fabric; means for holding the knife in said latter position during a rearward movement of the carriage; pattern means operable during said rearward movement of the carriage to move the knife into cutting relation to cut the pile warp on another forward movement; and means for rendering the said latter means inoperative at certain times to prevent the knife from being moved into cutting relation with the pile and thereby not acting to cut the pile warp during certain of the forward movements of the carriage.

2. The combination, in a loom for weaving pile fabrics, of a knife carriage; a pile cutting knife movably mounted within the knife carriage; means for moving the carriage transversely to the length of the pile warp in opposite directions; means for moving the knife into cutting relation to cut the pile warp during a forward movement of the carriage transversely to the length of the pile warp; means for moving the knife on the carriage to withdraw the same from cutting relation with the fabric; means for holding the knife in said latter position during a rearward movement of the carriage; pattern means operable during said rearward movement to engage said first knife-moving means to move the knife into cutting relation to cut pile warp on another forward movement; and means for rendering the said pattern means inoperative at certain times to prevent the knife from being moved into cutting relation with the pile and thereby not acting to cut the pile warp during certain of the forward movements of the carriage, said pattern means being rendered operative at other times to again effect the movement of the knife into cutting relation with the pile warp so as to again cut the warp during other forward movements of the knife carriage.

3. The combination, in a loom for weaving pile fabrics, of a pile-evening roller; and means for moving the said roller in contact with the pile of the fabric throughout the entire width thereof.

4. The combination, in a loom for weaving pile fabrics, of a pile-evening roller normally out of contact with the pile of the fabric; and means for moving the roller into contact and, with the continued movement, immediately out of contact with the said pile.

5. The combination, in a loom for weaving pile fabric, of a pile-evening roller normally out of engagement with the pile of the fabric; and means for reciprocating the roller across the fabric and in contact with the pile, each of the said movements in either direction being such as to allow the roller to be out of contact with the pile at the end of each movement in each direction.

6. The combination, in a loom for weaving pile fabric, of a knife-carriage; a knife in said carriage; means for moving the knife to cut certain of the picks of pile warp and to allow others to remain uncut; and a pile-evening member carried by said carriage and into contact with the pile warp.

7. The combination, in a loom for weaving pile fabric, of a knife carriage; a knife in said carriage; means for moving the knife to cut certain of the picks of pile warp and to allow others to remain uncut; and a pile-evening roller carried by said carriage for contacting with the pile warp.

8. The combination, in a loom for weaving pile fabric, of a knife carriage; a knife in said carriage; means for moving the knife to cut certain of the picks of pile warp and to allow others to remain uncut; and a pile-evening roller carried by said carriage and into contact with the pile warp, said roller being loosely mounted on said carriage so as to be free to rotate and vibrate thereon while in contact with the pile warp.

9. The combination, in a loom for weaving pile fabrics, of a pile warp; a series of pile wires; means for successively inserting and withdrawing the pile wires; a knife carriage; a knife movably mounted in the carriage; means for normally holding the knife in cutting relation with the pile warp; means for moving the knife carriage and operable in conjunction with the means for inserting and withdrawing the wires, for each inserting and withdrawing movement of the wires; means for moving and holding the knife out of cutting relation with the warp; pattern means for actuating the knife during the said latter movement of the carriage to allow it to be again moved into cutting relation with the pile warp to cut the latter during the next wire inserting movement and the corresponding movement of the knife carriage; and means for moving the said pattern means to prevent the knife from being moved into cutting relation with the warp so as not to cut the latter during the said movement of the knife carriage in the said latter direction.

10. The combination, in a loom for weaving pile fabrics, a series of pile wires; means for successively inserting and withdrawing said pile wires; a pile cutting knife; means for moving the knife transversely of the pile warp for each wire inserting and withdrawing movement of the loom; and means for automatically moving the knife into and out of cutting relation with the pile warp to cut the pile loops formed on some of the wires and leave uncut the loops formed on other wires.

11. The combination, in a loom for weaving pile fabrics, a series of pile wires; means for successively inserting and withdrawing said wires; a knife carriage; a knife movably mounted on said carriage; means for holding the knife in cutting relation with the pile warp; means operative in conjunction with the wire inserting and withdrawing means for moving the knife in opposite directions transversely of the pile warp; means for moving and holding the knife out of cutting relation with the warp after the carriage has made a cutting movement in one direction and during the return movement of said carriage; means operative on the knife-holding means for again moving the knife into cutting relation with the pile warp; and a device for actuating said last means to prevent movement of the knife into cutting position at predetermined times.

12. The combination, in a loom for weaving pile fabrics, a series of pile wires; means for successively withdrawing and inserting the pile wires; a knife carriage; a rail for the knife carriage; a knife slidably mounted within the knife carriage; means for holding the knife in cutting relation with the pile warp; means for moving the carriage forwardly and rearwardly across the fabric and to cut the pile warp during the said forward movement; a spring for moving and holding the knife out of cutting relation with the pile during a rearward movement of the said carriage; pattern means movable to respectively effect a movement of the knife into cutting relation with the fabric and against the action of the said spring to cut the pile on the next forward movement of the carriage, and movable at other times to prevent the said latter movement of the knife so as not to cut the pile on a following forward movement of the carriage; and auxiliary means movable into position to effect movement of the knife against the action of the said spring for each rearward movement of the carriage to cause the movement of the knife into cutting relation with the pile to cut the latter for each forward movement of the carriage.

13. The combination, in a loom for weaving pile fabrics, a series of pile wires; means for successively withdrawing and inserting the pile wires; a knife carriage; a rail for the knife carriage; a knife slidably mounted within the knife carriage; means for holding the knife in cutting relation with the pile warp; means for moving the carriage forwardly and rearwardly across the fabric and to cut the pile warp during the said forward movement; a spring for moving and holding the knife out of cutting relation with the pile during a rearward movement of the said carriage; pattern means; means for moving the pattern means to respectively effect a movement of the knife into cutting relation with the fabric and against the action of the said spring to cut the pile on the next forward movement of the carriage, and movable at other times to prevent the said latter movement of the knife so as not to cut the pile on a following forward movement of the carriage; auxiliary means movable into active position to effect movement of the knife against the action of the said spring for each rearward movement of the carriage to allow the movement of the knife into cutting relation with the pile to cut the latter for each pick; and means for cleaning the knife during each forward movement.

14. The combination, in a loom for weaving pile fabrics, a series of pile wires; means for successively withdrawing and inserting the pile wires; a knife carriage; a rail for the knife carriage; a knife slidably mounted within the knife carriage; means for normally holding the knife in cutting relation with the pile warp; means for moving the carriage forwardly and rearwardly across the fabric and to cut the pile warp during the said forward movement; a spring for moving and holding the knife out of cutting relation with the pile during a rearward movement of the said carriage; pattern means movable to respectively effect a movement of the knife into cutting relation with the fabric and against the action of the said spring to cut the pile on the next forward movement of the carriage, and movable at other times to prevent the said latter movement of the knife so as not to cut the pile on a following forward movement of the carriage; auxiliary means movable into active position to effect movement of the knife against the action of the said spring for each rearward movement of the carriage to allow the movement of the knife into cutting relation with the pile to cut the latter for each forward movement of the carriage; and means for sharpening the knife for each forward movement.

15. The combination, in a loom for weaving pile fabrics, of a knife carriage; a knife movably mounted within the carriage; knife-actuating means on the carriage; means for reciprocating the knife carriage across the loom; a spring for moving and holding the knife out of cutting relation with the fabric; means for operating the knife-actuating means to allow the spring to move and hold the knife out of cutting relation with the warp during a movement of the knife carriage; pattern means; and means for moving the pattern means to contact with the knife-actuating means and thereby again move the knife into cutting relation with the warp, and to move the pattern means so as not to contact with the knife-actuating means and thereby allow the knife to remain out of cutting relation with the pile so as not to cut the latter on certain of forward movements of the knife carriage.

16. The combination, in a loom for weaving pile fabrics, of a knife carriage; a knife movably mounted within the carriage; knife-actuating means on the carriage; means for reciprocating the knife carriage across the loom; a spring for moving and holding the knife out of cutting relation with the pile; means for operating the knife-actuating means to allow the spring to move the knife out of cutting relation with the warp; pattern means having projections spaced apart; means for moving the projections to contact with the knife-actuating means and thereby again move the knife into cutting relation with the warp, and to again move the pattern means so as to move the said projections so as not to contact with the knife-actuating means and thereby allow the knife to remain out of cutting relation with the pile so as not to cut the latter on certain of the forward movements of the knife carriage.

17. The combination, in a loom for weaving pile fabrics, of a knife carriage; a knife movably mounted within the carriage; knife-actuating means carried by the carriage; a spring for moving and holding the knife out of cutting relation with the pile; means for moving the carriage forwardly and rearwardly across the fabric; means for operating the knife-actuating means to allow the spring to raise the latter out of cutting relation with the pile; a pattern wheel having projections; means for moving the projections to contact with the knife-actuating means and thereby operate the latter to move the knife into cutting relation with the pile to cut the latter during certain forward movements of the pile carriage and to move the projections so as not to contact with the knife-actuating means and thereby allow the knife to remain out of engagement with the pile during other of the forward movements of the pile carriage and thereby allow certain of the forward movements of the pile carriage to occur without the cutting of the pile.

18. The combination, in a loom for weaving pile fabrics, of a knife carriage; a guide rail for the knife carriage; a knife movably mounted in the carriage; knife-actuating means mounted on the knife carriage; means for moving the knife carriage forwardly and rearwardly across the fabric to cut the pile during the said forward movements; a spring for moving and holding the knife out of cutting relation with the pile; a pattern wheel having projections thereon; means timed with the loom for moving the projections to contact with the knife actuating means to move the knife again into cutting relation with the pile to cut the warp on the next forward movement of the pile carriage and to move the said pattern means so as not to contact with the knife-actuating means and thereby not to cut the pile during certain of the said forward movements of the pile carriage.

19. The combination, in a loom for weaving pile fabrics, of a knife carriage; a knife slidably mounted within the knife carriage; a shogging plate slidably mounted on the knife carriage; a lever pivotally mounted on the carriage and having a slot formed therein; a pin fixed in said shogging plate and extending within the said slot in the lever; said shogging plate having an extension adapted to engage and move the knife into cutting relation with the pile, when the said shogging plate is shifted; a spring mounted on said carriage and operable on said knife to move the latter out of cutting relation with the pile; a pattern member having projections spaced apart; a tripping finger; means for moving the knife carriage forwardly and rearwardly across the fabric, one end of the said shogging plate being adapted to engage the projections on the said pattern wheel to lower the cutting knife into cutting relation with the pile; said tripping finger being positioned to contact with the said lever to allow the knife to be raised by the said spring out of cutting relation with the said pile during the said movements of the knife carriage; means for actuating the pattern means to move the projections away from and so as not to contact with the said end of the shogging plate and to again move the projections into contacting position with the said end of the shogging plate.

20. The combination, in a loom for weaving pile fabrics, of a carriage; a knife movably mounted within said carriage; a spring for normally holding the knife out of cutting relation with the pile warp; a shogging plate on said carriage; a lever pivoted on said carriage having a slot formed therein; a pin on said shogging plate extending within the said slot of the lever; an extension on said shogging plate and operable when the latter is moved in one direction to move the knife into cutting relation with the pile and against the action of the said spring; and means forming a relative movement between the carriage and the shogging plate to move the knife into cutting relation of the pile.

21. The combination, in a loom for weaving pile fabric, of pile cutting mechanism including a knife carriage; a knife slidably mounted within the knife carriage; a shogging plate movably mounted on the carriage; a lever pivoted to the carriage and having a slot formed therein; a projection on the said shogging plate and projecting within the said slot; said shogging plate having a portion adapted to engage and move the knife into cutting position; means for automatically moving the knife out of cutting position; means operable against the shogging plate to cause friction between the latter and the said knife carriage; a tripping finger; a pattern member; and means for moving the shogging plate into contact with the pattern member to move the knife into cutting position and for moving the lever into contact with the tripping finger to allow the knife to be moved out of cutting position by the said automatic means.

22. The combination, in a loom for weaving pile fabric, of pile cutting mechanism including a knife carriage; a knife slidably mounted within the knife carriage; a shogging plate movably mounted on the carriage; a lever pivoted to the carriage and having a slot formed therein; a projection on the said shogging plate and projecting within the said slot; said shogging plate having a portion adapted to engage and move the knife into cutting position; automatic means for moving the knife out of cutting position; means operable against the shogging plate to cause friction between the latter and the said knife carriage; a tripping finger; a pattern member; means for moving the shogging plate into contact with the pattern means to move the knife into cutting position and for moving the lever into contact with the tripping finger to allow the knife to be moved out of cutting position; and means independent of the said pattern means for abutment with the said shogging plate to move the knife into cutting position.

23. The combination, in pile cutting mechanism, of a knife carriage; a knife slidably mounted in the carriage and having a cam face thereon and a hook-shape locking portion; a shogging plate on said carriage and having a portion adapted to engage said cam portion on the knife to move the latter and to pass under said hook portion to lock the knife in said moved position; a lever pivoted on said carriage and having a slot therein; a pin on said shogging plate and engaging said slot; means for applying friction to said shogging plate; and additional means for moving the knife.

24. The combination, in a pile cutting mechanism, of a rail; a knife carriage slidable thereon; a pile-cutting knife on said carriage; means on the carriage for lowering said knife into cutting position; a pattern member having projections thereon and a ratchet wheel; a lever; a pawl on said lever; means for normally keeping the pawl in engagement with the ratchet; means for actuating the lever to move the pawl and pattern member to bring the projections of the latter into and out of alinement with the knife-lowering means; and means for moving the carriage.

25. The combination, in a pile cutting mechanism, of a knife carriage; a knife movably mounted in said carriage; a plate for moving the knife into cutting position; a spring for moving the knife out of cutting position; a pattern wheel; a ratchet connected to the pattern wheel, said pattern wheel having a projection formed thereon; a pivotally mounted actuating lever; a pawl carried by the said actuating lever; means for holding the pawl into contact with the said ratchet; means for actuating the said pivoted lever to impart movement to the said pattern wheel through the medium of the said pawl; a ratchet to intermittently move the said projection into contacting alinement with the said means for moving the pile cutting knife into cutting position and to move the said projection out of contacting alinement with the said latter means; means for moving the knife carriage; and a tripping finger positioned to cause a relative movement between the carriage and said plate during the said latter movement of the carriage to permit the said spring to move the knife out of cutting position.

26. The combination, in a pile cutting mechanism, of a knife carriage; means for moving the knife carriage; a knife movably mounted in said knife carriage and having a cam portion and a hooked portion; a shogging plate slidably mounted on said carriage and having a portion adapted to engage the said cam and thereby lower the knife into cutting position and to move within said hooked portion to lock the said knife in the said cutting position; a lever pivoted to said carriage and having a slot formed therein; a pin fixed within the said shogging plate and extending into the said slot in the lever; a pattern wheel having a plurality of projections; a ratchet fixed to the said wheel; a pivotally mounted actuating lever; a pawl carried by said lever; means for holding said pawl in engagement with the ratchet; means for actuating the said lever to intermittently move the said pattern wheel to move each of said projections into contacting alinement with the end of said shogging plate and thereby lower the knife into cutting position and to move the projections out of contacting alinement with the ends of the shogging plate to prevent the lowering of the knife; a spring for normally keeping the knife in a raised position; and a tripping finger for engagement with the said lever on the knife carriage to move the said shogging plate and allow the said spring to move the knife out of its cutting position.

27. The combination, in a loom for weaving pile fabrics, of a knife carriage; a pile cutting knife mounted in said carriage; a rail for supporting said carriage; two rail supports, one of said supports having a slideway formed therein and adapted to receive one end of the rail, the other of said supports having a slot formed therein; a plate secured to the opposite end of the rail; a bolt pivotally mounted in said plate and passing through the slot in said support; a handle fixed to the bolt; a link plate having a slot therein, said bolt passing through said link plate and having a pin normally adapted to lock said bolt against said link plate and, when the said bolt is turned, being adapted to pass through the said slot in the link plate and allow the rail and plate to be lifted bodily; and tension springs operable on the link plate to allow transverse movement of the said rail.

28. The combination, in a loom for weaving pile fabrics, of a knife carriage; a rail for supporting the knife carriage; a rod connected to the said knife carriage; a wire carriage; a lever pivotally mounted to the wire carriage and having a slot and a pin therein; a pin on said wire carriage and projecting through the said slot of the lever; a tension spring connecting the said lever and the said wire carriage; a head on the end of said rod; a groove in said head, said pin on said lever extending in the said groove; and movable means for spanning said groove to keep said pin normally within said groove in the head.

29. The combination, in a loom for weaving pile fabrics, a series of pile wires; a knife carriage; a rail for supporting the carriage; wire alining means carried by said rail; and means operable against the rail and by the beat up of the lay to increase the pressure of the said wire alining means against the wires and during said rearward movement of the lay to decrease the pressure of the said wire alining means against the wires.

30. The combination, in a loom for weaving pile fabrics; a series of pile wires; a knife carriage; a rail supporting the knife carriage; wire alining members on said rail; an alining finger operable against said rail; a lay; an arm on said lay; and means connecting the said alining finger with the said arm on the lay to respectively increase and decrease the intensity of the pressure of the alining members against the pile wires on the beat up and rearward movement of the said lay.

31. The combination, in a loom for weaving pile fabrics, a series of pile wires; a knife carriage; a rail for supporting the knife carriage; wire alining members on said rail; an alining finger operable against said rail; a tension spring; a lay; an arm on said lay; means connecting the said spring with said arm; and means connecting the said spring with said alining finger.

32. The combination, in a loom of pile cutting mechanism, of a knife carriage; means for moving the knife carriage; a knife movably mounted in said knife carriage and having a cam portion and a hooked portion; a shogging plate slidably mounted on said carriage and having a portion adapted to engage the said cam and thereby lower the knife into cutting position and to move within said hooked portion to lock the said knife in the said cutting position; a lever pivoted to said carriage and having a slot formed therein; a pin fixed within the said shogging plate and extending into the said slot in the lever; a pattern wheel having a plurality of projections; a ratchet fixed to the said wheel; a pivotally mounted actuating lever; a pawl carried by said lever; means for holding said pawl in engagement with the ratchet; pile wire; a wire carriage; means for operating the wire carriage; an actuating pin pivotally mounted in two directions and carried by the wire carriage and operatively adapted to engage the said actuating lever to move the latter in one direction; a spring for moving the actuating lever in an opposite direction, said actuating pin and said spring serving to intermittently move the design wheel to move the projections into and out of abutting alinement with the said shogging plate to respectively lower the knife into cutting position and to prevent the knife from being lowered into cutting position; and a tripping finger for engagement with the said lever on the knife carriage to move the said shogging plate and allow the said spring to move the knife out of its cutting position.

33. The combination, in a loom of pile cutting mechanism, of a knife carriage; means for moving the knife carriage; a knife movably mounted in said knife carriage and having a cam portion and a hooked portion; a shogging plate slidably mounted on said carriage and having a portion adapted to engage the said cam and thereby lower the knife into cutting position and to move within said hooked portion to lock the said knife in the said cutting position; a lever pivoted to said carriage and having a slot formed therein; a pin fixed within the said shogging plate and extending into the said slot in the lever; a pattern wheel having a plurality of projections; a ratchet fixed to the said wheel; a pivotally mounted actuating lever; a pawl carried by said lever; means for holding said pawl in engagement with the ratchet; pile wire; a wire carriage; means for operating the wire carriage; an actuating pin pivotally mounted in two directions and carried by the wire carriage and operatively adapted to engage the said actuating lever to move the latter in one direction; a spring for moving the actuating lever in an opposite direction, said actuating pin and said spring serving to intermittently move the design wheel to move the projections into and out of abutting alinement with the said shogging plate to respectively lower the knife into cutting position and to prevent the knife from being lowered into cutting position; a tripping finger for engagement with the said lever on the knife carriage to move the said shogging plate and allow the said spring to move the knife out of its cutting position; a wire withdrawing hook; and an eccentric connected to said actuating pin and operable when the pin is turned to move the said wire withdrawing hook into an inoperative position.

In testimony whereof, I have signed my name to this specification, in the presence of two subscribing witnesses.

ALFRED F. McCOLLUM.

Witnesses:
AUGUSTUS B. COPPES,
WM. A. BARR.